United States Patent
Vahadane et al.

(10) Patent No.: US 12,165,310 B2
(45) Date of Patent: Dec. 10, 2024

(54) BLUR-ROBUST IMAGE SEGMENTATION

(71) Applicant: Rakuten Group, Inc., Tokyo (JP)

(72) Inventors: Abhishek Vahadane, Maharashtra (IN); Devraj Mandal, West Bengal (IN); Shantanu Majumdar, West Bengal (IN); Madan Dabbeeru, Bengaluru (IN)

(73) Assignee: Rakuten Group, Inc., Tokyo (JP)

(*) Notice: Subject to any disclaimer, the term of this patent is extended or adjusted under 35 U.S.C. 154(b) by 551 days.

(21) Appl. No.: 17/388,576

(22) Filed: Jul. 29, 2021

(65) Prior Publication Data

US 2023/0034727 A1    Feb. 2, 2023

(51) Int. Cl.
*G06T 7/00*    (2017.01)
*G06T 5/70*    (2024.01)
(Continued)

(52) U.S. Cl.
CPC .............. *G06T 7/0012* (2013.01); *G06T 5/70* (2024.01); *G06T 5/73* (2024.01); *G06T 7/11* (2017.01); *G06T 11/00* (2013.01); *G06T 2207/10056* (2013.01); *G06T 2207/10064* (2013.01); *G06T 2207/20081* (2013.01); *G06T 2207/20084* (2013.01); *G06T 2207/30024* (2013.01);
(Continued)

(58) Field of Classification Search
CPC .......... G06T 7/0012; G06T 5/70; G06T 5/73; G06T 7/11; G06T 11/00; G06T 2207/10056; G06T 2207/10064; G06T 2207/20081; G06T 2207/20084; G06T 2207/30024; G06T 2207/30096; G06T 2207/30168

USPC ......................................................... 382/133
See application file for complete search history.

(56) References Cited

U.S. PATENT DOCUMENTS

| | | | |
|---|---|---|---|
| 2012/0057070 A1* | 3/2012 | Park | H04N 23/676 348/E5.045 |
| 2013/0121537 A1* | 5/2013 | Monobe | H04N 23/683 382/106 |

(Continued)

FOREIGN PATENT DOCUMENTS

| | | | | |
|---|---|---|---|---|
| CN | 110458127 B | * | 2/2021 | G06T 5/002 |
| CN | 111246092 | * | 7/2021 | H04N 23/67 |

(Continued)

OTHER PUBLICATIONS

Benoît Lelandais et al., "Deconvolution regularized using fuzzy c-means algorithm for biomedical image deblurring and segmentation," 2015 IEEE 12th International Symposium on Biomedical Imaging (ISBI), pp. 1457-1461 (5 pages total).

(Continued)

*Primary Examiner* — Jerome Grant, II
(74) *Attorney, Agent, or Firm* — Sughrue Mion, PLLC (57) ABSTRACT

A method, computer program, and computer system is provided for image processing. Data corresponding to an out-of-focus image is received. A first image is generated based on segmenting the received data. A second image is generated based on sharpening the received data corresponding to the out-of-focus image. A third image corresponding to one or more predetermined objects (e.g., cells) in the out-of-focus image is generated based on post-processing the generated first and second images.

20 Claims, 4 Drawing Sheets

(51) Int. Cl.
*G06T 5/73* (2024.01)
*G06T 7/11* (2017.01)
*G06T 11/00* (2006.01)

(52) U.S. Cl.
CPC ............ *G06T 2207/30096* (2013.01); *G06T 2207/30168* (2013.01)

(56) References Cited

U.S. PATENT DOCUMENTS

| | | | |
|---|---|---|---|
| 2016/0267668 A1* | 9/2016 | Yamada | G06T 7/136 |
| 2017/0230568 A1* | 8/2017 | Yamaguchi | G06T 7/13 |

FOREIGN PATENT DOCUMENTS

| | | | | | |
|---|---|---|---|---|---|
| CN | 113992848 | * | 1/2022 | ......... | H04N 23/6811 |
| JP | 3678160 | * | 8/2005 | | |
| JP | 2007-048006 A | | 2/2007 | | |
| JP | H0756787 | * | 6/2010 | | |
| WO | WO2022182340 | * | 9/2022 | ............... | G06T 5/00 |

OTHER PUBLICATIONS

Extended European Search Report dated Jan. 2, 2023 in European Application No. 22185995.2.
Shunxin Xu et al., "Synergy Between Semantic Segmentation and Image Denoising via Alternate Boosting", 2021 pp. 1-10 (10 pages total).
Ignacio Arganda-Carreras et al., "Trainable Weka Segmentation: a machine learning tool for microscopy pixel classification", Bioinformatics, 2017, vol. 33, No. 15, pp. 2424-2426 (3 pages total).
Tim-Oliver Buchholz et al., "DenoiSeg: Joint Denoising and Segmentation", 2020, pp. 1-12 (12 pages total).

* cited by examiner

BLUR-ROBUST IMAGE SEGMENTATION

BACKGROUND

This disclosure relates generally to field of data processing, and more particularly to machine learning.

Automated nuclei segmentation from immunofluorescence (IF) microscopic images is a crucial first step in cancer diagnosis and treatments. Much research has been devoted to develop novel algorithms to give high performance on the same. However, there are only a few literatures that tackle the problem of nuclei segmentation in poor quality microscopic images. Defocus and motion blur are the two most common microscopic imaging artifacts that can severely degrade an image quality. They increase the risk of misdiagnosis and false treatment. Blur in microscopic images is inevitable due to staining process of biopsy slides and acquisition. Thus, Quality Control (QC) modules may reject out-of-focus images from further downstream analysis. A metric to quantify the QC of an image may be used as a threshold to determine its usefulness. For example, cell count accuracy may be decreased for increasing focus blur.

SUMMARY

Embodiments relate to a method, system, and computer readable medium for image processing. According to one aspect, a method for image processing is provided. The method may include receiving data corresponding to an out-of-focus image. A first image is generated based on segmenting the received data. A second image is generated based on sharpening the received data corresponding to the out-of-focus image. A third image corresponding to one or more cells in the out-of-focus image is generated based on post-processing the generated first and second images.

According to another aspect, a computer system for image processing is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data corresponding to an out-of-focus image. A first image is generated based on segmenting the received data. A second image is generated based on sharpening the received data corresponding to the out-of-focus image. A third image corresponding to one or more objects (e.g., cells) in the out-of-focus image is generated based on post-processing the generated first and second images.

According to yet another aspect, a computer readable medium for image processing is provided. The computer readable medium may include one or more computer-readable storage devices and program instructions stored on at least one of the one or more tangible storage devices, the program instructions executable by a processor. The program instructions are executable by a processor for performing a method that may accordingly include receiving data corresponding to an out-of-focus image. A first image is generated based on segmenting the received data. A second image is generated based on sharpening the received data corresponding to the out-of-focus image. A third image corresponding to one or more objects (e.g., cells) in the out-of-focus image is generated based on post-processing the generated first and second images.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to machine learning. The following described exemplary embodiments provide a system, method and computer program to, among other things, segment image data. Therefore, some embodiments have the capacity to improve the field of computing by allowing for the use of deblur prediction to selectively locate and segregate touching objects (such as cells) in a digital image.

As previously described, automated nuclei segmentation from immunofluorescence (IF) microscopic images is a crucial first step in cancer diagnosis and treatments. Much research has been devoted to developing novel algorithms to give high performance on the same. Blur in microscopic images is inevitable due to staining process of biopsy slides and acquisition. Thus, Quality Control (QC) modules may reject out-of-focus images from further downstream analysis. A metric to quantify the QC of an image may be used as a threshold to determine its usefulness. For example, cell count accuracy may be decreased for increasing focus blur.

However, manual annotation of the nuclei on blurred microscopic images is a challenging task as compared to the same task on a sharper image, such as where the same image is displayed for different focus levels with the sharper and out-of-focus counterpart. Closely packed nuclei may be very difficult to separate. Though the above works can be potentially used as a pre-processing step in conjunction with a segmentation network to work on blurry images. It requires more computational resources and two separate modules to handle the de-focusing and segmentation objectives of the task at hand. Additionally, training a supervised deep learning based segmentation algorithm requires images along with accurately annotated ground-truth, and manual annotation may require considerable time and cost.

It may be advantageous, therefore, to annotate crude, blurry as well as sharp images. This may be done by using the same network for two tasks (i.e. deblur and semantic segmentation) to combine deblur and segmentation loss values and use back-propagation to tune the network weights. Touching cell marker information may be obtained from a deblurred prediction to further improve the nuclei segmentation performance. A deblur task along with trivial nuclei segmentation task to learn a good feature from a blurry image may be used resolve the touching cells in the predicted segmentation.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that segment image data for identifying features in an image. While exemplary embodiments herein are described with reference to segmenting microscopy image data from for identifying cells in an image, it is understood that the present disclosure is not limited thereto and may be applicable to segmenting any type of image data for identifying objects (e.g., predetermined objects) therein.

Figure 1:
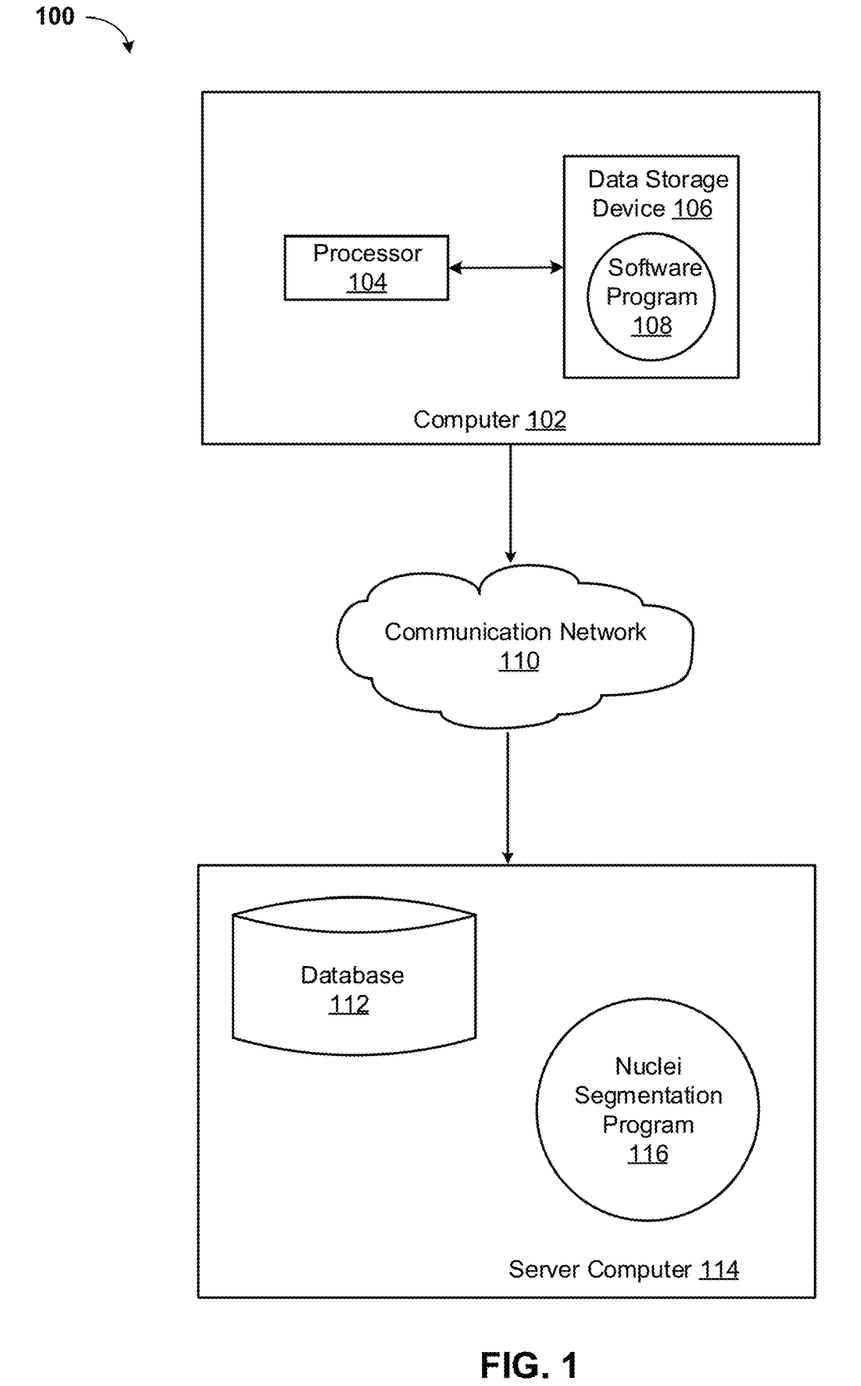
FIG. 1 illustrates a networked computer environment according to at least one embodiment.

Referring now to FIG. 1, a functional block diagram of a networked computer environment illustrating an image segmentation system 100 (hereinafter "system") for segmenting nuclei in image data. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114, which may be used for identifying and segmenting nuclei and cells, is enabled to run a Nuclei Segmentation Program 116 (hereinafter "program") that may interact with a database 112. The Nuclei Segmentation Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger nuclei segmentation program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
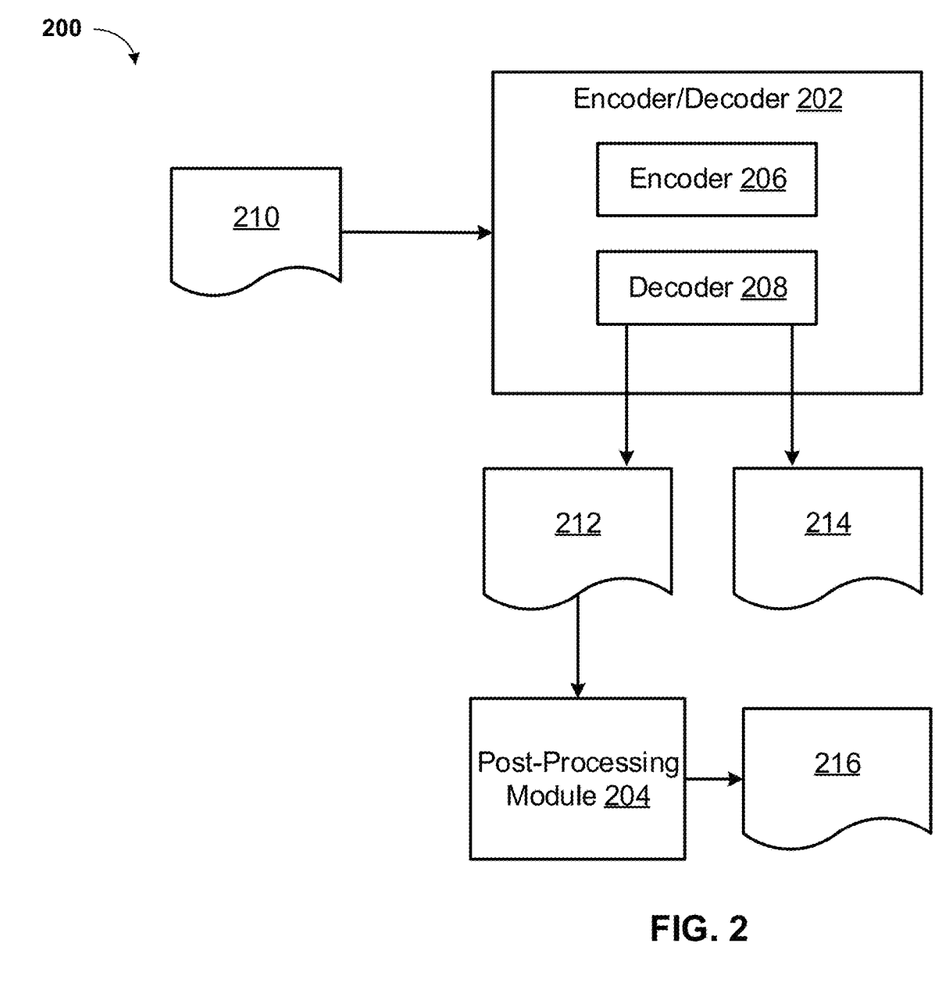
FIG. 2 is a block diagram of a deep learning system for image processing and nuclei segmentation, according to at least one embodiment.

Referring now to FIG. 2, a block diagram of a deep learning system 200 is depicted. The deep learning system 200 may include, among other things, an encoder/decoder 202, and a post-processing module 204. The encoder/decoder 202 may include an encoder 206 and a decoder 208. The encoder/decoder 202 may receive input data 210. The input data 210 may be, for example, a blurred image or a sharp image. The encoder 206 is common for the entire network. The decoder 208 predicts two outputs: a segmentation output 212 and a de-noising output 214 The decoder 208 may have first few convolution layers common for both the outputs. Last convolutional layers of the decoder 208 are separate for each prediction output. The first prediction output 212 may be a three-channel segmentation image 212 ($I_{nuc}$) based on nuclei, boundary, and background of the image data 210. The second prediction output 214 may be a deblurred (i.e., sharpened) output image 214 ($I_{deblur}$). The second prediction output 214 may be output for expert interpretation.

A total loss value $L_{total}$ may be used to train the encoder-decoder as the sum of losses for the nuclei segmentation and the deblur. The total loss value may be given as:

$$L_{total} = L_{nuc} + L_{deblur},$$

where $L_{nuc}$ may be a nuclei segmentation loss value and $L_{deblur}$ may be a deblur loss value. The nuclei segmentation loss value may be given as:

$$L_{nuc} = L_{ce}(I_{nuc}, I_{gt}),$$

and the deblur loss value may be given as:

$$L_{deblur} = L_{mse}(I_{deblur}, I_{sharp}).$$

The total loss value may be optimized through backpropagation and using Adam optimizer.

The deblur and nuclei segmentation loss values may be calculated independently, and adding deblur task may regularize the network and improve the performance of nuclei segmentation. The nuclei channel from $I_{nuc}$ can be post-processed by the post-processing module 204 to remove the touching cells by subtracting boundary from nuclei. However, it may not be possible to resolve all the overlapped cells. Thus, the deblur output $I_{deblur}$ based post-processing may be used to selectively locate the unresolved touching cells in the predicted nuclei segmentation $I_{nuc}$. The selected candidates may be processed to resolve the overlapped cells and generated output data 216. The processing used may include marker-controlled watershed segmentation. The markers are obtained by computing local maxima of distance transform of $I_{deblur}$. It may be appreciated that processing time may be saved by only processing region or patch around candidates.

Figure 3:
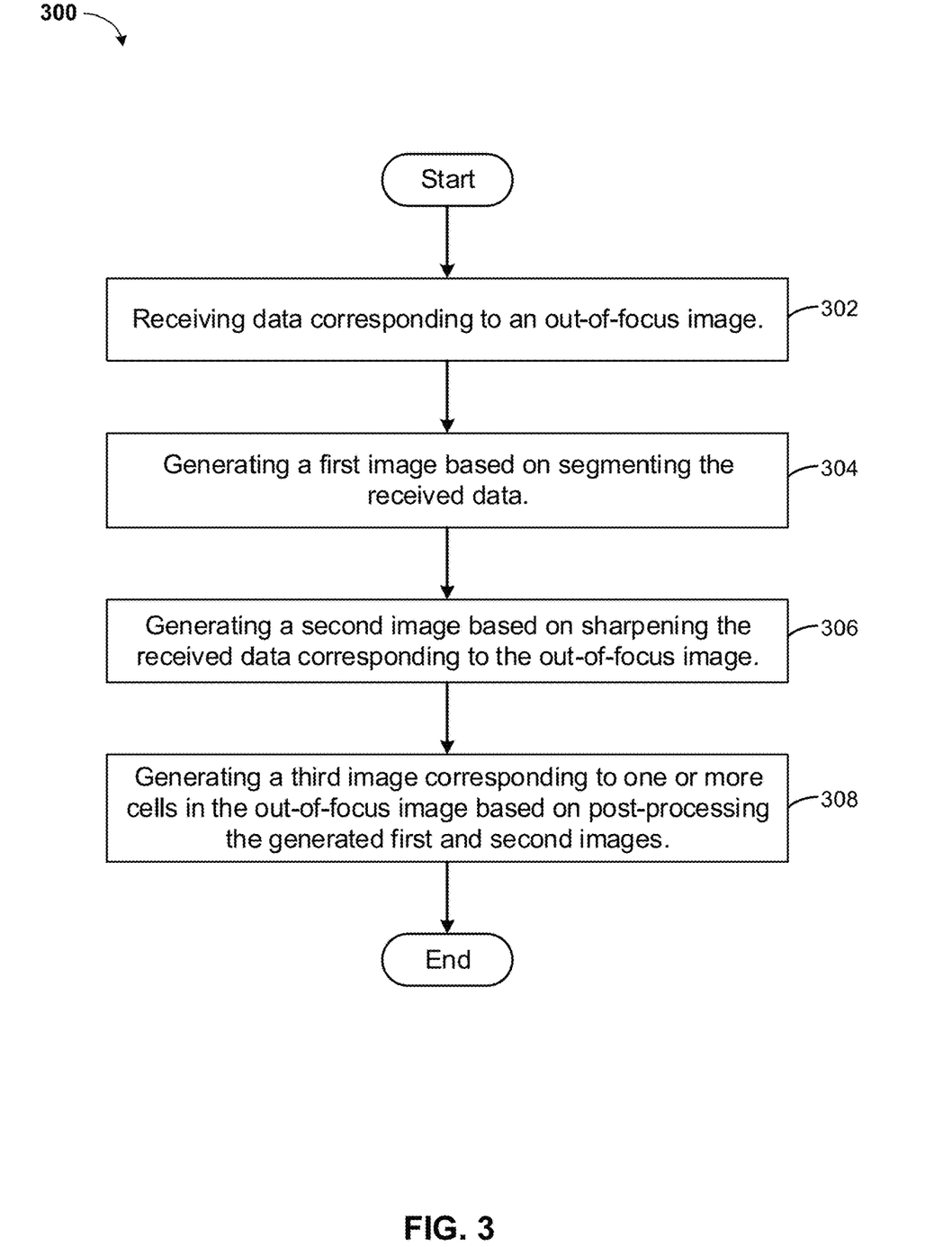
FIG. 3 is an operational flowchart illustrating the steps carried out by a program that segments image data, such as nuclei segmentation, according to at least one embodiment.

Referring now to FIG. 3, an operational flowchart illustrating the steps of a method 300 carried out by a program that segments image data, such as nuclei segmentation, is depicted.

At 302, the method 300 may include receiving data corresponding to an out-of-focus image.

At 304, the method 300 may include generating a first image based on segmenting the received data.

At 306, the method 300 may include generating a second image based on sharpening the received data corresponding to the out-of-focus image.

At 308, the method 300 may include generating a third image corresponding to one or more cells in the out-of-focus image based on post-processing the generated first and second images.

It may be appreciated that FIG. 3 provides only an illustration of one implementation and does not imply any limitations with regard to how different embodiments may be implemented. Many modifications to the depicted environments may be made based on design and implementation requirements.

Figure 4:
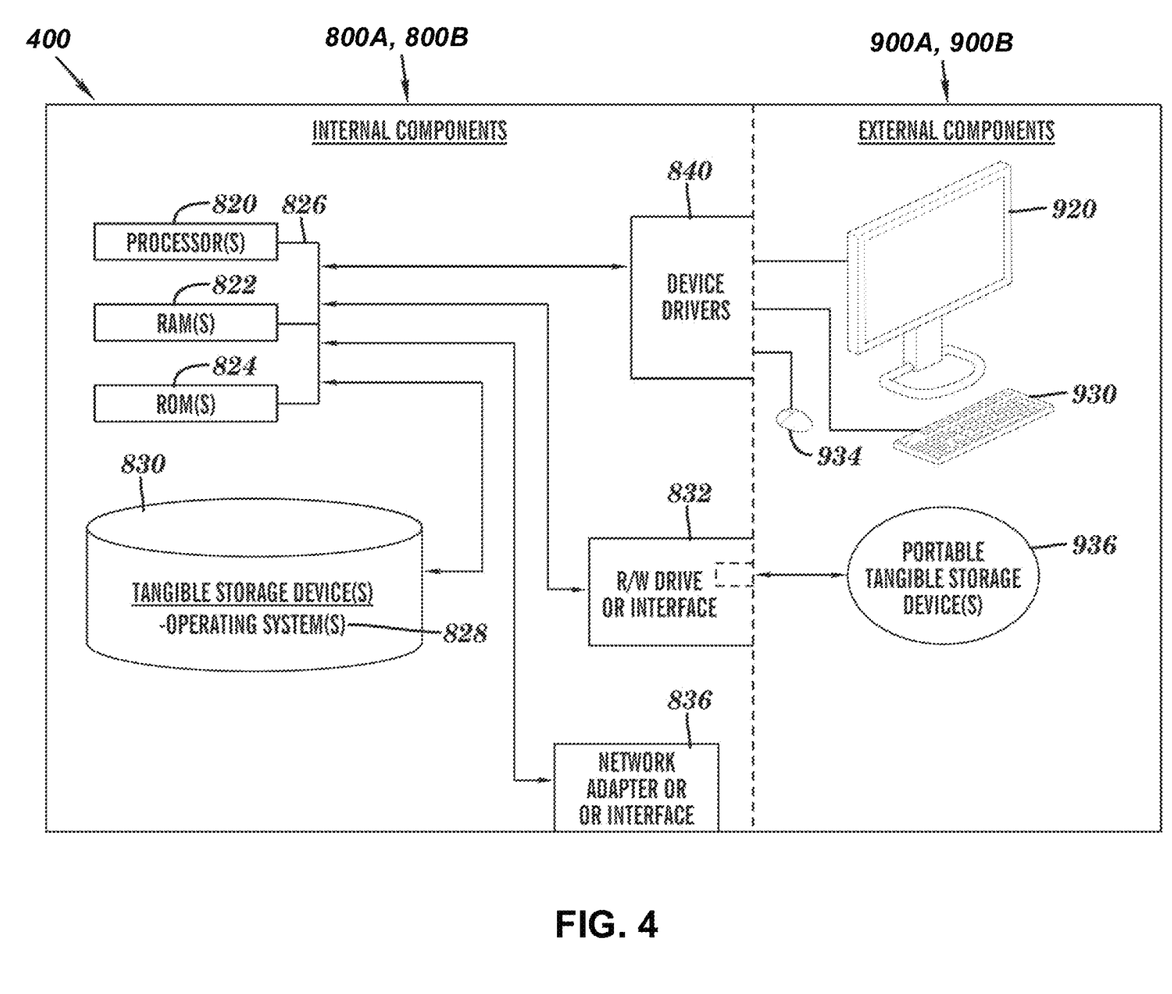
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Nuclei Segmentation Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Nuclei Segmentation Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Nuclei Segmentation Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Nuclei Segmentation Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of image processing, executable by a processor, the method comprising:
   receiving data corresponding to an out-of-focus image;
   generating a first image based on segmenting the received data;
   generating, independent of generating the first image, a second image based on sharpening the received data corresponding to the out-of-focus image; and
   generating a third image corresponding to one or more predetermined objects in the out-of-focus image based on post-processing the generated first image and post-processing the generated second image.

2. The method of claim 1, wherein the first image and the second image are generated from the out-of-focus image based on one or more outputs from a convolutional neural network.

3. The method of claim 1, further comprising resolving an object and a neighboring object from among the one or more predetermined objects in the generated third image.

4. The method of claim 1, wherein the second image is generated based on identifying nuclei, boundaries, and a background associated with the out-of-focus image.

5. The method of claim 4, further comprising generating instance maps based on the identified nuclei, boundaries, and background.

6. The method of claim 5, further comprising generating markers for individual nuclei based on the minimized noise.

7. The method of claim 1, wherein the third image is generated based on minimizing noise associated with the out-of-focus image.

8. The method of claim 5, wherein the noise is minimized based on minimizing a loss value based on a nucleus loss value and a deblur loss value.

9. A computer system for image processing, the computer system comprising:
   one or more computer-readable non-transitory storage media configured to store computer program code; and
   one or more computer processors configured to access said computer program code and operate as instructed by said computer program code, said computer program code including:
     receiving code configured to cause the one or more computer processors to receive data corresponding to an out-of-focus image;
     first generating code configured to cause the one or more computer processors to generate a first image based on segmenting the received data;
     second generating code configured to cause the one or more computer processors to generate, independent of the generated first image, a second image based on sharpening the received data corresponding to the out-of-focus image; and
     third generating code configured to cause the one or more computer processors to generate a third image corresponding to one or more predetermined objects in the out-of-focus image based on post-processing the generated first image and post-processing the generated second image.

10. The computer system of claim 9, wherein the first image and the second image are generated from the out-of-focus image based on one or more outputs from a convolutional neural network.

11. The computer system of claim 9, further comprising resolving code configured to cause the one or more computer processors to resolve an object and a neighboring object from among the one or more predetermined objects in the generated third image.

12. The computer system of claim 9, wherein the second image is generated based on identifying nuclei, boundaries, and a background associated with the out-of-focus image.

13. The computer system of claim 12, further comprising generating code configured to cause the one or more computer processors to generate instance maps based on the identified nuclei, boundaries, and background.

14. The computer system of claim 9, wherein the third image is generated based on minimizing noise associated with the out-of-focus image.

15. The computer system of claim 14, wherein the noise is minimized based on minimizing a loss value based on a nucleus loss value and a deblur loss value.

16. The computer system of claim 14, further comprising generating markers for individual nuclei based on the minimized noise.

17. A non-transitory computer readable medium having stored thereon a computer program for image processing, the computer program configured to cause one or more computer processors to:
    receive data corresponding to an out-of-focus image;
    generate a first image based on segmenting the received data;
    generate, independent of the generated first image, a second image based on sharpening the received data corresponding to the out-of-focus image; and
    generate a third image corresponding to one or more predetermined objects in the out-of-focus image based on post-processing the generated first image and post-processing the generated second image.

18. The computer readable medium of claim 17, wherein the first image and the second image are generated from the out-of-focus image based on one or more outputs from a convolutional neural network.

19. The computer readable medium of claim 17, wherein the computer program is further configured to cause one or more computer processors to resolve an object and a neighboring object from among the one or more predetermined objects in the generated third image.

20. The computer readable medium of claim 17, wherein the computer program is further configured to cause one or more computer processors to:
    identify nuclei, boundaries, and a background associated with the out-of-focus image; and
    generate instance maps based on the identified nuclei, boundaries, and background.

* * * * *